(12) United States Patent
Kanno et al.

(10) Patent No.: US 7,715,886 B2
(45) Date of Patent: May 11, 2010

(54) METHOD AND APPARATUS OF REDUCED POWER CONSUMPTION IN TDMA SIGNAL RECEPTION VIA BACKWARD OUTPUT OF INPUT STREAM TO ELIMINATE RECEIVER TRAINING PERIOD

(75) Inventors: Ippei Kanno, Kyoto (JP); Ryosuke Mori, Osaka (JP); Daisuke Hayashi, Osaka (JP); Kouji Setoh, Osaka (JP); Tetsuya Yagi, Osaka (JP); Noritaka Iguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 733 days.

(21) Appl. No.: 11/579,736

(22) PCT Filed: May 11, 2005

(86) PCT No.: PCT/JP2005/009011

§ 371 (c)(1),
(2), (4) Date: Nov. 7, 2006

(87) PCT Pub. No.: WO2005/109655

PCT Pub. Date: Nov. 17, 2005

(65) Prior Publication Data

US 2007/0217356 A1 Sep. 20, 2007

(30) Foreign Application Priority Data

May 11, 2004 (JP) ............... 2004-141557
Jan. 21, 2005 (JP) ............... 2005-014812

(51) Int. Cl.
*H04B 7/212* (2006.01)
*H04B 1/16* (2006.01)
*H04L 27/00* (2006.01)
*H03D 3/18* (2006.01)

(52) U.S. Cl. .............. 455/574; 370/321; 455/343.2; 375/326; 375/327

(58) Field of Classification Search ............... 370/350
See application file for complete search history.

(56) References Cited

U.S. PATENT DOCUMENTS

| 5,710,792 | A | 1/1998 | Fukawa et al. |
| 6,118,808 | A | 9/2000 | Tiemann et al. |
| 6,963,736 | B2 | 11/2005 | Tähtinen |
| 2003/0153369 | A1 | 8/2003 | Laiho et al. |

(Continued)

FOREIGN PATENT DOCUMENTS

EP 0 959 574 11/1999

(Continued)

*Primary Examiner*—Nick Corsaro
*Assistant Examiner*—Munsoon Choo
(74) *Attorney, Agent, or Firm*—Wenderoth, Lind & Ponack, L.L.P.

(57) ABSTRACT

The present invention aims to provide a reception apparatus that receives and demodulates a signal transmitted by using time-division multiplexing, with reduced power consumption. In detail, a receiving unit including a tuner operates to receive a signal only during a time period for which a desired signal is transmitted. The received signal is converted into digital data, and the digital data is stored into a memory. With the use of the digital data stored in the memory, a PLL performs all of the necessary operations from synchronization establishment to demodulation.

8 Claims, 10 Drawing Sheets

U.S. PATENT DOCUMENTS

| | | | |
|---|---|---|---|
| 2004/0014505 A1* | 1/2004 | Rainish et al. | 455/574 |
| 2005/0009502 A1* | 1/2005 | Little et al. | 455/411 |
| 2005/0088958 A1* | 4/2005 | Abel et al. | 370/201 |
| 2005/0157650 A1 | 7/2005 | Laiho et al. | |

FOREIGN PATENT DOCUMENTS

| | | |
|---|---|---|
| EP | 1 253 721 | 10/2002 |
| JP | 2846959 | 1/1999 |
| WO | 2003/043210 | 5/2003 |

* cited by examiner

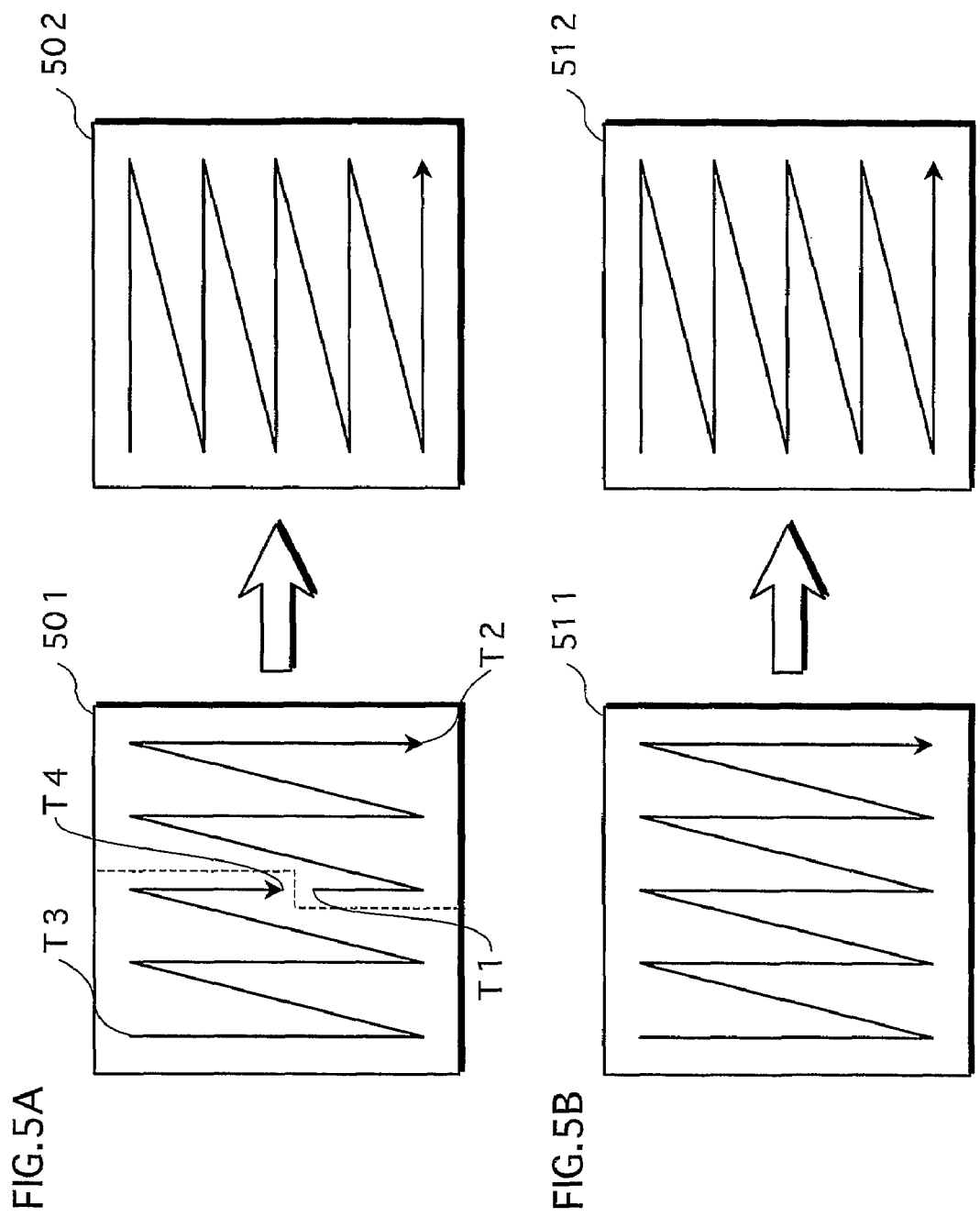

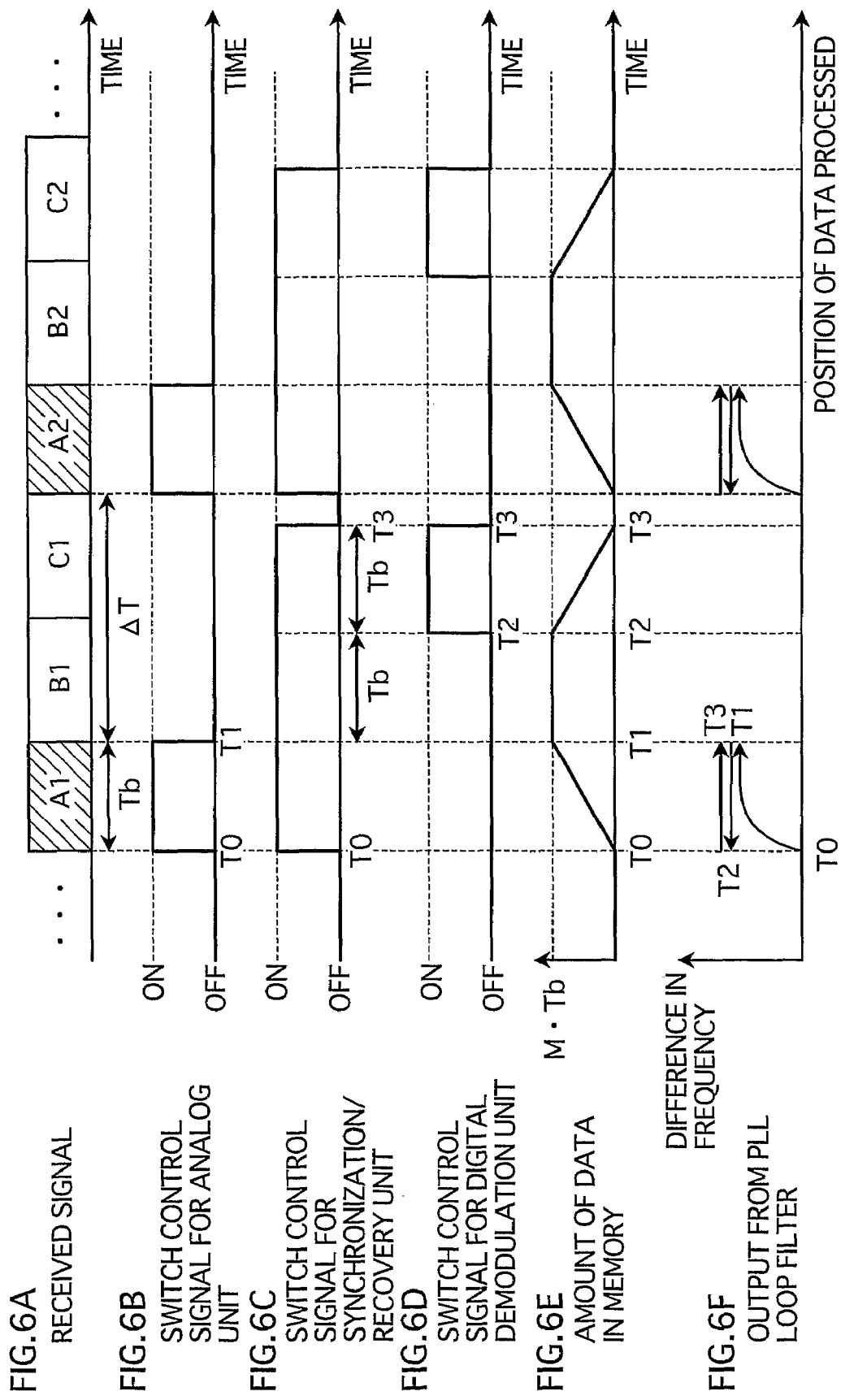

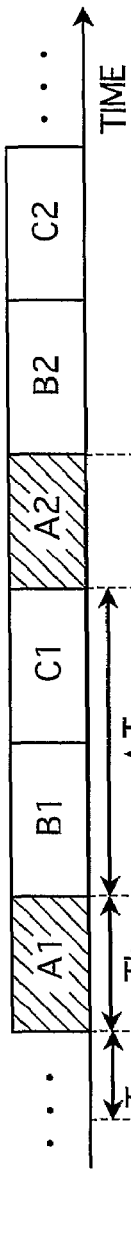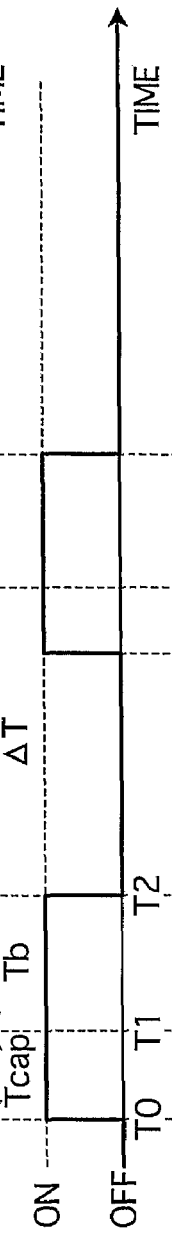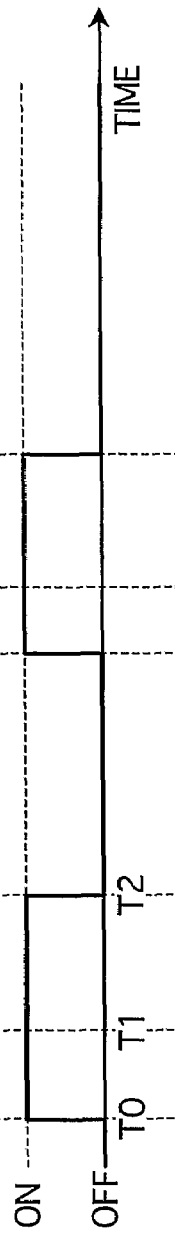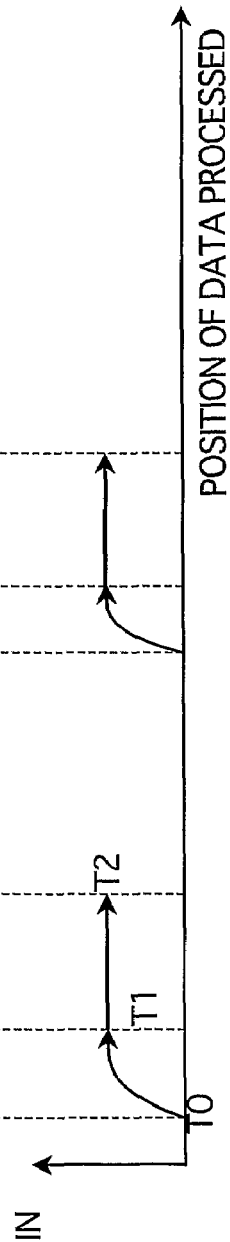

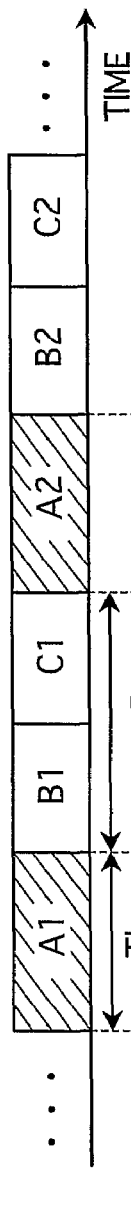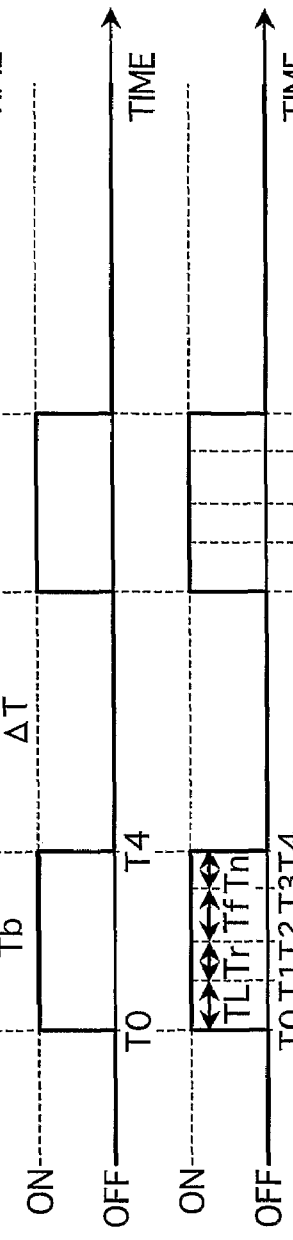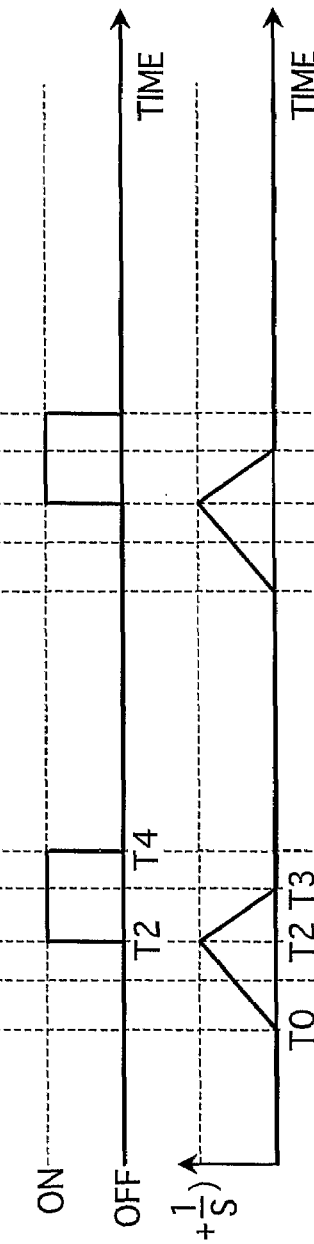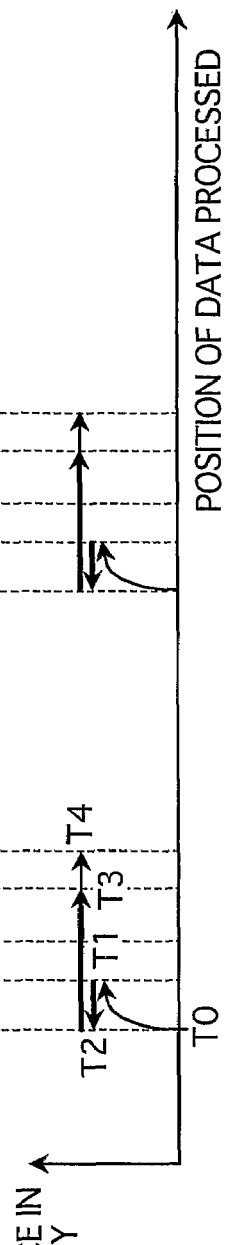

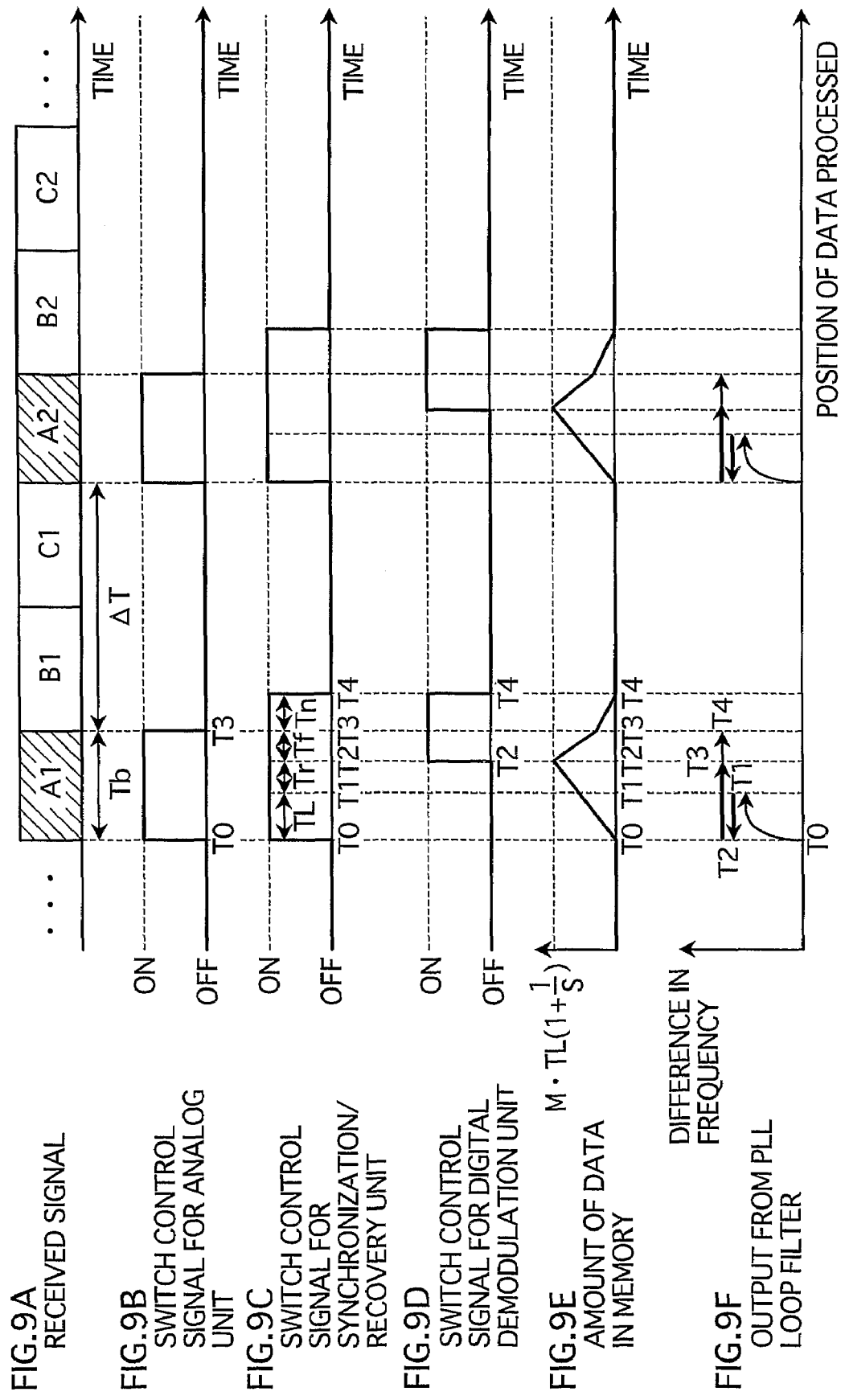

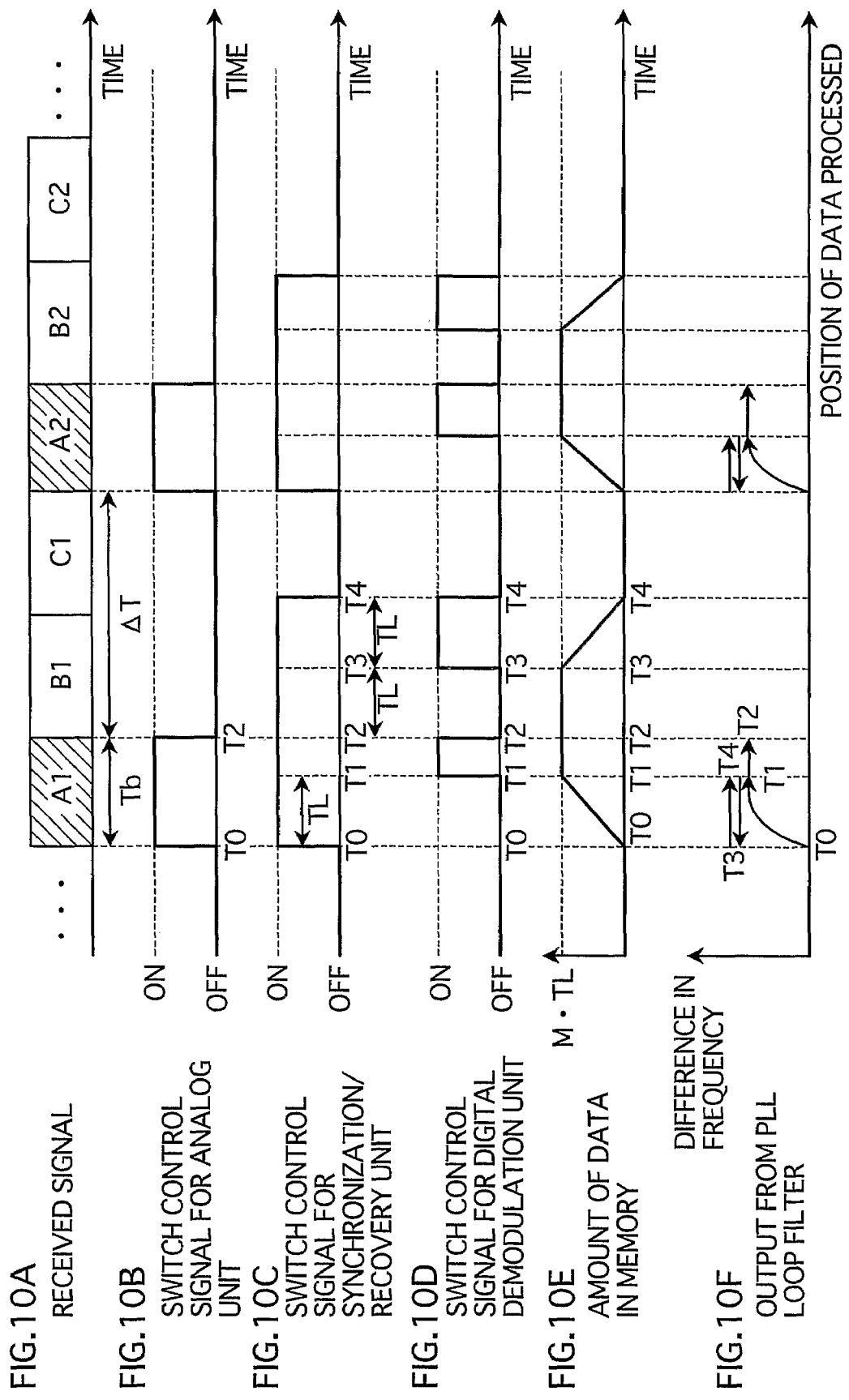

METHOD AND APPARATUS OF REDUCED POWER CONSUMPTION IN TDMA SIGNAL RECEPTION VIA BACKWARD OUTPUT OF INPUT STREAM TO ELIMINATE RECEIVER TRAINING PERIOD

TECHNICAL FIELD

The present invention relates to a reception apparatus for receiving a signal transmitted on a time-division multiplexing basis, and particularly to a technique to realize reduction in power consumption.

BACKGROUND ART

Digital broadcast reception apparatuses such as digital televisions receive a broadcast signal corresponding to programs transmitted on a time-division multiplexing basis, and sequentially demodulate the received signal, to display the programs. Such reception apparatuses are only required to receive a desired signal, that is to say, to be switched on only during a time period for which a broadcast signal of a program that is desired by a user or a computer program corresponding to each user is transmitted.

In such reception apparatuses for receiving a signal transmitted by using time-division multiplexing, a tuner needs to be switched on during a time period for which a desired signal is not transmitted, in order to receive the desired signal properly and stably (see Japanese Patent No. 2846959).

During this period (hereinafter referred to as "a training period"), power is supplied to the tuner unit even though the desired signal is not received. This power supply is not desirable from the aspect of power saving.

In light of this, the present invention aims to provide a reception apparatus that receives a desired signal only, with reduced wasteful power consumption.

DISCLOSURE OF THE INVENTION

The above aim is achieved by a reception apparatus for receiving a broadcast wave carrying a signal string transmitted on a time-division multiplexing basis, the signal string including a modulation signal generated by digital modulating a desired signal using a predetermined modulation method. Here, the reception apparatus comprises a receiving unit operable to operate to receive the broadcast wave only during a time period for which the modulation signal is transmitted, and generate an analog input signal, an input stream generating unit operable to generate an input stream by analog-to-digital converting the input signal generated by the receiving unit, a storing unit operable to store the input stream, and a demodulating unit operable to demodulate the input stream stored in the storing unit, by using a demodulation method corresponding to the predetermined modulation method, to obtain the desired signal.

According to this construction, the receiving unit (including a tuner and the like) of the reception apparatus is switched on to receive a signal, only during the time period for which the modulation signal corresponding to the desired signal, i.e. a content desired by a user, is transmitted. Also, the reception apparatus can perform all of the operations up to the demodulation, based only on the modulation signal. Since a training period is not provided as in the conventional technique, power consumption required to receive a signal can be reduced.

Here, the storing unit stores the input stream in association with a generating time at which the receiving unit generates the input signal. The demodulating unit includes a PLL unit operable to generate a carrier and a clock based on the input stream, a digital demodulation unit operable to perform demodulation by using the carrier and clock generated by the PLL unit, to obtain the desired signal, and a demodulation control unit operable to control the storing unit and PLL unit so as to go through first, second, and third steps. Here, in the first step, the storing unit outputs the input stream to the PLL unit, forward in an order of the generating time, beginning with a start of the input stream, so that the PLL unit performs an operation to establish synchronization based on the input stream output from the storing unit. In the second step which starts at or after a time when the PLL unit establishes the synchronization, the storing unit outputs the input stream backward in the order of the generating time, up to the start, so that the PLL unit tracks the input stream with maintaining the synchronization. In the third step, the storing unit outputs the input stream forward in the order of the generating time, beginning with the start, so that the PLL unit generates the carrier and clock with maintaining the synchronization, and the digital demodulation unit performs the demodulation based on the carrier and clock, to obtain the desired signal.

According to this construction, the reception apparatus formed by using a PLL can obtain the desired signal by performing the above-described three steps.

Here, the second step starts at the time when the PLL unit establishes the synchronization in the first step.

Here, the demodulating unit further includes a high-speed clock generating unit operable to generate a high-speed clock faster than a normal rate. In the second step, the PLL unit operates at the high-speed clock generated by the high-speed clock generating unit. In the third step, the PLL unit and digital demodulation unit operate at the high-speed clock.

According to this construction, the third step can start earlier. In this way, the necessary capacity for the storing unit of the reception apparatus can be reduced.

Here, in the third step, if an entire input stream stored in the storing unit is demodulated by the digital demodulation unit before the receiving unit completes receiving the modulation signal, an input signal subsequently generated by the receiving unit is analog-to-digital converted into an input stream, and the input stream is demodulated by the digital demodulation unit without being stored into the storing unit.

According to this construction, if the entire input stream stored in the storing unit is demodulated by the digital demodulation unit before the receiving unit completes receiving the modulation signal, a normal clock is subsequently utilized as an alternative to the high-speed clock. Thus, power consumption can be reduced. This is because the reception apparatus requires lower power consumption when operating at a normal clock than at a high-speed clock.

Here, the reception apparatus further comprises a switch control unit operable to appropriately switch the receiving unit, PLL unit, digital demodulation unit on or off.

According to this construction, each of the units is controlled to be switched on or off in the first, second, and third steps. This can reduce power consumption.

Here, the demodulating unit further includes a storage unit operable to store the desired signal obtained by the digital demodulation unit. Before the time when the PLL unit establishes the synchronization in the first step, an input signal generated by the receiving unit is analog-to-digital converted into an input stream, and the input stream is stored into the storing unit. After the time when the PLL unit establishes the synchronization in the first step, an input signal generated by the receiving unit is analog-to-digital converted into an input stream, the input stream is demodulated by the digital demodulation unit, without being stored into the storing unit, to obtain part of the desired signal, and the obtained part of the desired signal is stored into the storage unit. After the receiving unit completes receiving the modulation signal, the digital demodulation unit demodulates the input stream that is stored in the storing unit before the time when the PLL unit establishes the synchronization, through the second and third steps.

According to this construction, it is not necessary to store, into the storing unit, an input stream generated by analog-to-digital converting a generated input signal, after synchronization is established. Thus, the necessary capacity for the storing unit of the reception apparatus can be reduced.

The above aim is also achieved by a reception and demodulation method utilized in a reception apparatus for receiving a broadcast wave carrying a signal string transmitted on a time-division multiplexing basis, the signal string including a modulation signal generated by digital modulating a desired signal using a predetermined modulation method. Here, the broadcast wave is received only during a time period for which the modulation signal is transmitted, and an analog input signal is generated, an input stream is generated by analog-to-digital converting the input signal, the input stream is stored, and the input stream stored in the storing unit is demodulated, by using a demodulation method corresponding to the predetermined modulation method, so that the desired signal is obtained.

According to this method, the reception apparatus is switched on to receive a signal only during a time period for which the modulation signal corresponding to the desired signal is transmitted, and demodulates the received signal.

The above aim is also achieved by an integrated circuit mounted in a reception apparatus for receiving a broadcast wave carrying a signal string transmitted on a time-division multiplexing basis, the signal string including a modulation signal generated by digital modulating a desired signal using a predetermined modulation method. The integrated circuit comprises a receiving unit operable to operate to receive the broadcast wave only during a time period for which the modulation signal is transmitted, and generate an analog input signal, an input stream generating unit operable to generate an input stream by analog-to-digital converting the input signal generated by the receiving unit, a storing unit operable to store the input stream, and a demodulating unit operable to demodulate the input stream stored in the storing unit, by using a demodulation method corresponding to the predetermined modulation method, to obtain the desired signal.

According to this integrated circuit, the reception apparatus is switched on to receive a signal only during a time period for which the modulation signal corresponding to desired signal is transmitted, and demodulates the received signal.

BRIEF DESCRIPTION OF THE DRAWINGS

FIG. 5 includes schematic views illustrating how to write/read data to/from a memory 402 in the error correction unit 113.

FIG. 6 is a timing chart illustrating a switching timing for a functional unit in the reception apparatus 100, in a first embodiment.

FIG. 7 is a timing chart illustrating a switching timing for a functional unit in a conventional reception apparatus.

FIG. 8 is a timing chart illustrating a switching timing for a functional unit in the reception apparatus 100, in a second embodiment.

FIG. 9 is a timing chart illustrating a switching timing for a functional unit in the reception apparatus 100, in the second embodiment.

FIG. 10 is a timing chart illustrating a switching timing for a functional unit in the reception apparatus 100, in a third embodiment.

BEST MODE FOR CARRYING OUT THE INVENTION

The following describes a reception apparatus relating to each embodiment of the present invention, with reference to the attached figures.

First Embodiment

<Construction>

Figure 1:
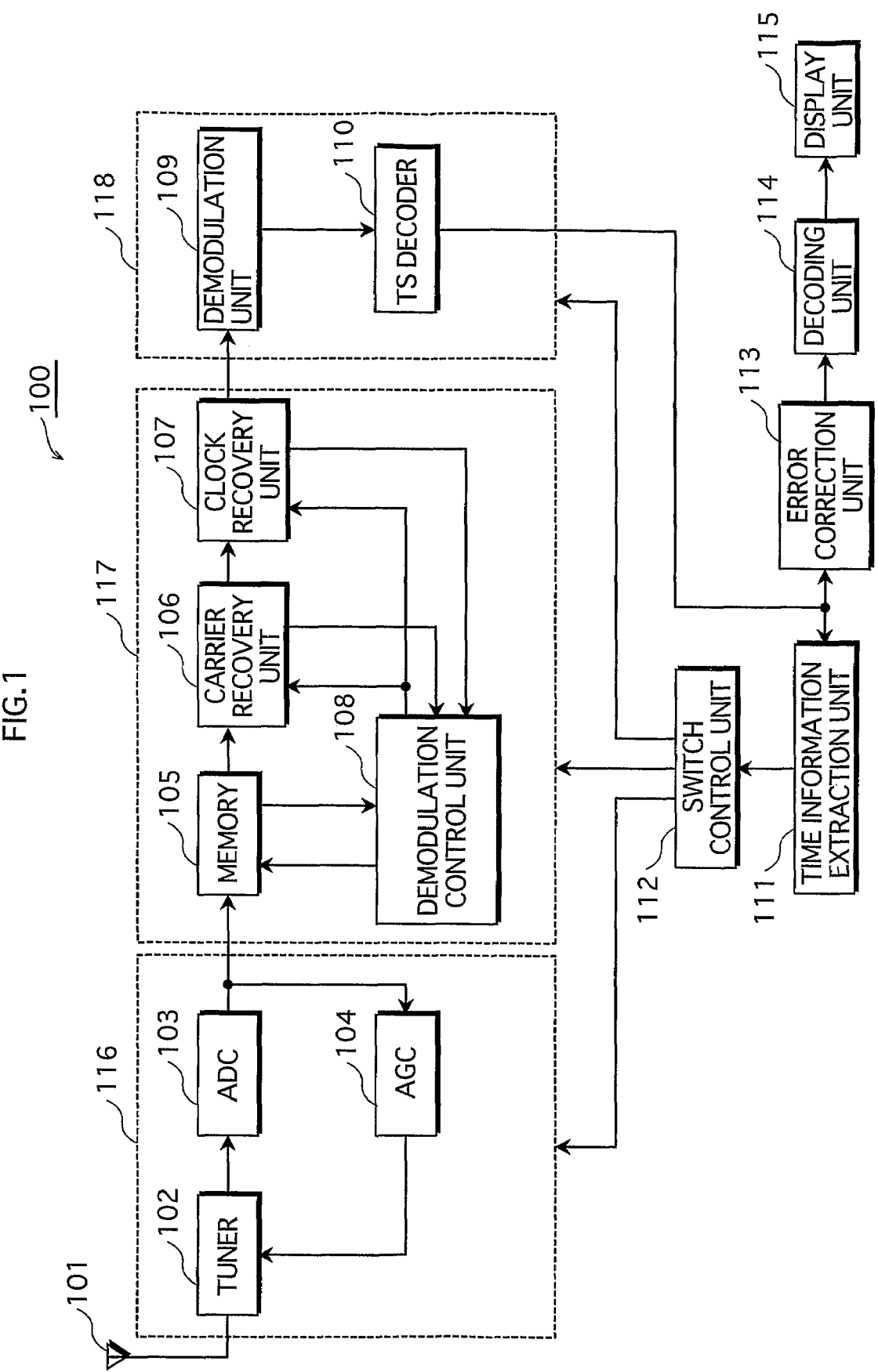
FIG. 1 is a functional block diagram illustrating a construction of a reception apparatus 100.

FIG. 1 is a functional block diagram illustrating a construction of a reception apparatus 100.

As shown in FIG. 1, the reception apparatus 100 is constituted by an antenna 101, a tuner 102, an analog-to-digital converter (ADC) 103, an automatic gain control (AGC) 104, a memory 105, a carrier recovery unit 106, a clock recovery unit 107, a demodulation control unit 108, a demodulation unit 109, a TS decoder 110, a time information extraction unit 111, a switch control unit 112, an error correction unit 113, a decoding unit 114, and a display unit 115.

The antenna 101 has a function of receiving a Digital Video Broadcasting-Handheld (DVB-H) broadcast signal transmitted from a broadcast station by using time-division multiplexing.

The tuner 102 has a function of selecting a channel desired by a user, and performing a gain control for a signal level.

The ADC 103 has a function of converting a signal received by the tuner 102 into digital data, and outputting the digital data to the AGC 104 and memory 105.

The AGC 104 has a function of generating and outputting an AGC control signal to the tuner 102, to keep an output level of a signal output from the tuner 102 constant.

The memory 105 has a function of temporarily storing the digital data generated by the ADC 103 by the analog-to-digital conversion. Basically, the digital data is stored in the order in which the tuner 102 receives the signal, beginning with a start address of the memory 105.

Figure 2:
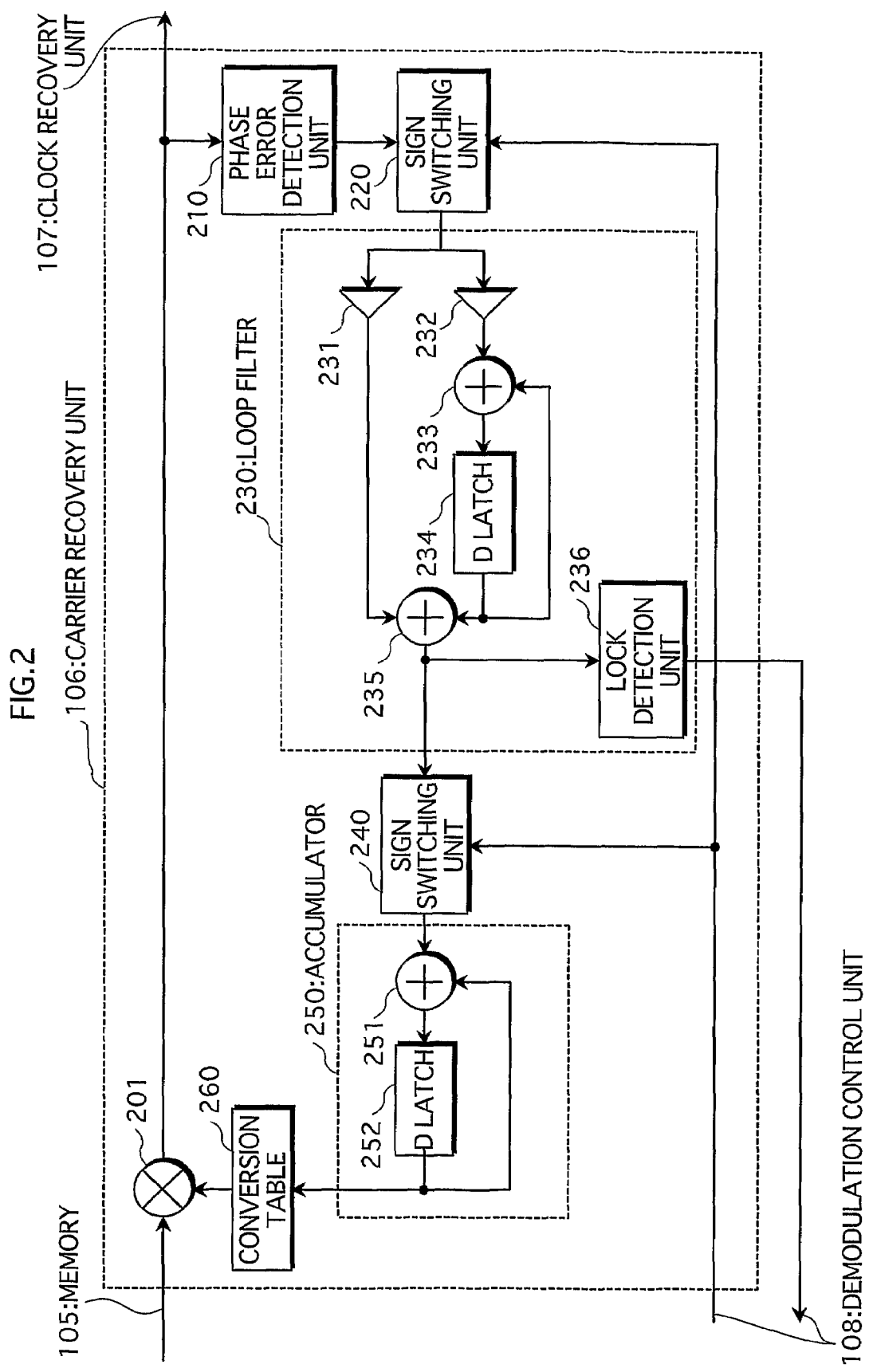
FIG. 2 is a functional block diagram illustrating a construction of a carrier recovery unit 106 in the reception apparatus 100.

The carrier recovery unit 106 is formed by using a PLL circuit. The carrier recovery unit 106 has a function of detecting a difference in frequency and phase, between a carrier of an input signal output from the memory 105 and a carrier generated therein, correcting the difference so as to establish synchronization between the carriers, and generating a carrier with maintaining the synchronization. The functional construction of the carrier recovery unit 106 is shown in FIG. 2, which is described in detail later.

Figure 3:
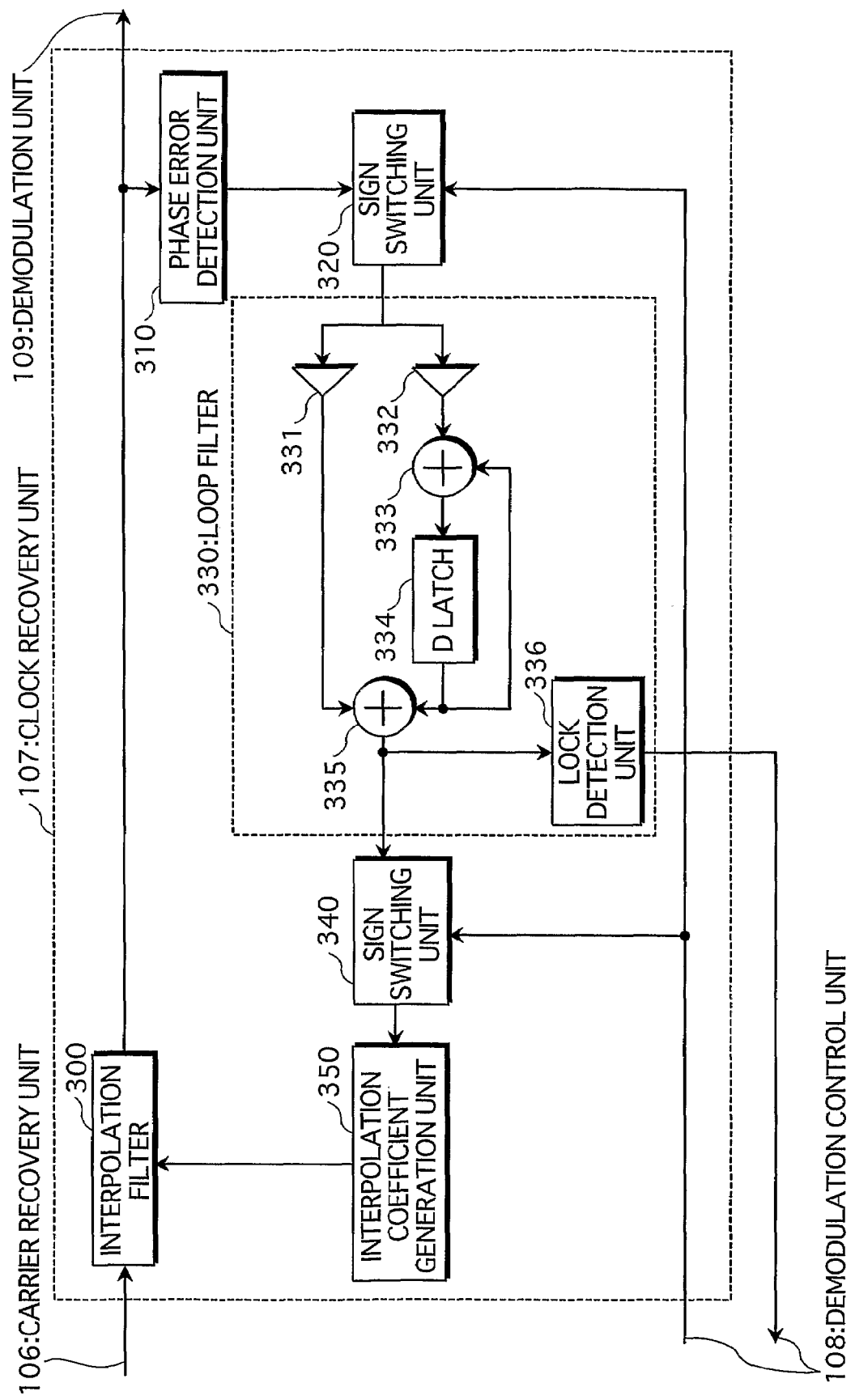
FIG. 3 is a functional block diagram illustrating a construction of a clock recovery unit 107 in the reception apparatus 100.

The clock recovery unit 107 is formed by using a PLL circuit. The clock recovery unit 107 has a function of correcting a difference in frequency and phase between a clock for an input signal and a clock generated therein so as to establish synchronization, and generating a clock with maintaining synchronization. The functional construction of the clock recovery unit 107 is shown in FIG. 3, which is described in detail later.

The demodulation control unit 108 has a function of controlling the memory 105, carrier recovery unit 106, clock recovery unit 107. Specifically speaking, the demodulation control unit 108 has a function of instructing the memory 105 to output digital data on a particular address. Furthermore, the demodulation control unit 108 has a function of determining, between plus and minus, the sign of each of the sign switching units 220, 240, 320, and 340 in the carrier recovery unit 106 and clock recovery unit 107 (see FIGS. 2 and 3).

The demodulation unit 109 has a function of performing Digital Video Broadcasting-Terrestrial (DVB-T) demodulation and error correction. Specifically speaking, using a carrier and a clock generated respectively by the carrier recovery unit 106 and clock recovery unit 107, the demodulation unit 109 establishes synchronization in the time domain. Then, the demodulation unit 109 determines an optimal window location based on guard interval correlation or the like, so as to convert an input signal into the frequency domain using Fast Fourier Transform (FFT) processing. After this, the demodulation unit 109 equalizes distortion in the transmission path of the frequency-domain signal. In this way, the demodulation unit 109 completes demodulation. The demodulation unit 109 then performs, on the demodulation output, error correction such as Viterbi decoding, deinterleaving, and Reed-Solomon (RS) decoding.

The TS decoder 110 has a function of receiving a transport stream (TS) output from the demodulation unit 109, extracting TS packets including a program desired by the user, and outputting the extracted TS packets to the time information extraction unit 111 and error correction unit 113.

The time information extraction unit 111 has a function of extracting time information, which is newly defined in DVB-H standard in a section header of a section transmitted in a series of TS packets, from the TS packets output from the TS decoder 110. Here, the time information indicates a duration of the time period between reception of partial data of a program and reception of next partial data of the same program, for example, a duration ΔT shown in FIG. 6. As seen from FIG. 6, the time period from when the reception apparatus 100 completes receiving a partial content A1 of a content A to when the reception apparatus 100 starts receiving a next partial content A2 has the duration ΔT.

The switch control unit 112 has a function of switching an analog unit 116, a synchronization/recovery unit 117, and a digital demodulation unit 118 on and off. To be specific, the switch control unit 112 keeps the analog unit 116 switched on, while the reception apparatus 100 is receiving a desired content. The switch control unit 112 switches the analog unit 116 on and off, based on time information transmitted to the reception apparatus 100 in the form of being superimposed on a broadcast signal. Here, the time information is obtained by the time information extraction unit 111, and sent to the switch control unit 112. The switch control unit 112 keeps the synchronization/recovery unit 117 switched on, while the synchronization/recovery unit 117 is in the process of establishing synchronization, and restoring data. The switch control unit 112 keeps the digital demodulation unit 118 switched on, while the demodulation unit 109 is demodulating a desired content, and the TS decoder 110 is decoding the demodulated content.

The error correction unit 113 is formed by using a Multi-Protocol Encapsulation Forward Error Collection (MPE-FEC) circuit, which is an error correction circuit added for DVB-H standard. The error correction unit 113 has a function of performing error correction such as RS decoding. The error correction unit 113 has therein a memory for block-deinterleaving. With the use of this memory, the error correction unit 113 also achieves a function of performing time-axis transformation to convert the partial contents A1, A2, . . . of the content A into continuous data.

The decoding unit 114 is a decoding circuit to decode audio visual data in MPEG-4 or H.264. The decoding unit 114 has a function of outputting decoded audio visual data to the display unit 115.

The display unit 115 is realized by constituents such as a display for outputting images, for example, a liquid crystal panel, and a loudspeaker or earphone for outputting sounds. Thus, the display unit 115 has a function of outputting images and sounds based on the data output from the decoding unit 114.

The following describes the construction of the carrier recovery unit 106 with reference to FIG. 2.

As shown in FIG. 2, the carrier recovery unit 106 is constituted by a complex multiplier 201, a phase error detection unit 210, the sign switching unit 220, a loop filter 230, the sign switching unit 240, an accumulator 250, and a conversion table 260.

The complex multiplier 201 has a function of complex multiplying a signal output from the memory 105 with a signal (a carrier) output from the conversion table 260.

The phase error detection unit 210 has a function of detecting a difference in frequency and phase between the signal output from the memory 105 and the carrier output from the conversion table 260, based on a complex signal output from the complex multiplier 201, and outputting a value indicating the difference.

The sign switching unit 220 has a function of determining, between plus and minus, the sign of the difference value output from the phase error detection unit 210, in response to an instruction from the demodulation control unit 108.

The loop filter 230 is a filter structured based on complete integral, and is constituted by gain setters 231 and 232, adders 233 and 235, a D latch 234, and a lock detection unit 236. The gain setter 232 multiplies the difference value with a predetermined numerical value. An accumulator constituted by the adder 233 and D latch 234 integrates the multiplied difference value. The gain setter 231 multiplies the difference value, whose sign is determined by the sign switching unit 220, with a predetermined numerical value. The adder 235 then adds the integrated difference value obtained by the accumulator and the multiplied difference value obtained by the gain setter 231 together, and outputs the result of the addition to the sign switching unit 240 and the lock detection unit 236. The lock detection unit 236 has a function of judging that the carrier recovery unit 106 is locked (synchronization is established) if a change in the value of the result output from the adder 235 over a predetermined time period is no more than a predetermined value. The data in the D latch 234 is reset at the start of reception of the next partial content.

The sign switching unit 240 has a function of determining, between plus and minus, the sign of data output from the loop filter 230, in response to an instruction from the demodulation control unit 108.

The accumulator 250 constituted by an adder 251 and a D latch 252 has a function of integrating a signal output from the sign switching unit 240, thereby performing conversion from an instantaneous frequency to an instantaneous phase.

The conversion table 260 is a table used to convert the phase output from the accumulator 250 into values of a cosine wave and a sine wave, thereby generating a complex carrier.

The following describes the construction of the clock recovery unit 107, with reference to the block diagram in FIG. 3.

The clock recovery unit 107 is constituted by an interpolation filter 300, a phase error detection unit 310, the sign switching units 320 and 340, a loop filter 330, and an interpolation coefficient generation unit 350. Here, the ADC 103 samples a transmitted signal according to a clock that is irrelevant to a clock unique to signal transmission (for example, a symbol rate or FFT frequency), when analog-to-digital converting the signal into digital data, which is to be stored in the memory 105. Therefore, the sampling rate needs to be changed so as to be in synchronization with the clock for signal transmission. Accordingly, the clock recovery unit 107 has a function of generating a received signal series in synchronization with a desired clock, by performing an interpolation operation between samples based on digital signal processing.

The interpolation filter 300 has a function of performing the above-mentioned interpolation operation. The interpolation filter 300 generates interpolation data based on a signal output from the carrier recovery unit 106 and a signal output from the interpolation coefficient generation unit 350.

The phase error detection unit 310 has a function of detecting a phase difference between an input signal and a clock generated therein, and outputting a value indicating the phase difference to the sign switching unit 320.

The sign switching unit 320 has a function of determining, between plus and minus, the sign of the difference value output from the phase error detection unit 310, in response to an instruction from the demodulation control unit 108.

The loop filter 330 is constituted by gain setters 331 and 332, adders 333 and 335, a D latch 334, and a lock detection unit 336. The gain setter 332 multiplies the difference value with a predetermined numerical value. An accumulator constituted by the adder 333 and D latch 334 integrates the multiplied difference value. The gain setter 331 multiplies the difference value, whose sign is determined by the sign switching unit 320, with a predetermined numerical value. The adder 335 then adds the integrated value obtained by the accumulator and the multiplied value obtained by the gain setter 331 together, and outputs the result of the addition to the sign switching unit 340 and the lock detection unit 336. The lock detection unit 336 has a function of judging that the clock recovery unit 107 is locked (synchronization is established) if a change in the value of the result output from the adder 335 over a predetermined time period is no more than a predetermined value. The data in the D latch 334 is reset at the start of reception of the next partial content.

The sign switching unit 340 has a function of determining, between plus and minus, the sign of data output from the loop filter 330, in response to an instruction from the demodulation control unit 108.

The interpolation coefficient generation unit 350 has a function of determining an interpolation timing and an interpolation coefficient, by correcting a ratio between the symbol rate and FFT frequency for signal transmission and the sampling frequency of the ADC 103, based on the value output from the sign switching unit 340. The interpolation coefficient generation unit 350 also has a function of thinning the sampling clock of the ADC 103 with keeping its timing, so that the sampling clock becomes synchronized with the symbol rate and FFT frequency for signal transmission, based on the determined interpolation timing. Thus, subsequent operations performed by the demodulation unit 109 and the like can be performed according to the clock generated by the interpolation coefficient generation unit 350.

<Operation>

The following describes the operation of the reception apparatus 100 relating to the first embodiment, with reference to the timing chart shown in FIG. 6.

FIG. 6A shows a schematic example of a signal transmitted on a time-division multiplexing basis. As seen from FIG. 6A, a plurality of contents are transmitted by using time-division multiplexing, in such a manner that a partial content A1 of a content A, a partial content B1 of a content B, a partial content C1 of a content C, partial contents A2, B2 and C2, . . . are transmitted in this order. Here, it is assumed that the user desires to watch the content A. Therefore, the reception apparatus 100 receives the partial contents A1, A2, . . . of the content A. A time period from when the reception apparatus 100 completes receiving the partial content A1 to when the reception apparatus 100 start receiving the next partial content A2 has the duration $\Delta T$. Here, information indicating the duration $\Delta T$ is transmitted to the reception apparatus 100 in the state of being superposed on a signal corresponding to the partial content A1.

FIG. 6B illustrates a timing to switch the analog unit 116 on and off. FIG. 6C illustrates a timing to switch the synchronization/recovery unit 117 on and off. FIG. 6D illustrates a timing to switch the digital demodulation unit 118 on and off. FIG. 6E illustrates the amount of digital data in the memory 105 at each time. In FIG. 6F, a difference in frequency output from the loop filters 230 and 330 is plotted along the vertical axis, and a position of digital data being processed at each time in the partial content A1 is plotted along the horizontal axis. When synchronization is established at a point between the time T0 and time T1, the difference in frequency becomes substantially zero. Here, in FIG. 6F, the arrow from the time T1 to the time T2, and the arrow from the time T2 to the time T3 are drawn separately for better intelligibility, but actually overlaid.

In the reception apparatus 100, the analog unit 116 is switched on at the time T0 so as to start receiving the partial content A1 via the antenna 101. The ADC 103 converts the received signal into digital data at its own sampling rate. The digital data is sequentially stored in the memory 105 in the order in which the signal is received. Here, at the time when the tuner 102 starts receiving the partial content A1 via the antenna 101 (the time T0), the switch control unit 112 also switches the synchronization/recovery unit 117 on.

The carrier recovery unit 106 and clock recovery unit 107 read the digital data stored in the memory 105 sequentially from the start in the stored order, and perform an operation to establish synchronization. To establish synchronization, a difference in frequency and phase is corrected between an input signal and carrier and clock generated by the carrier recovery unit 106 and clock recovery unit 107. As shown by the arrow from the time T0 to the time T1 in FIG. 6F, for example, the difference in frequency is gradually reduced, and synchronization is therefore gradually established. Thus, synchronization is established by the time T1. Between the time T0 and time T1, the demodulation control unit 108 sets the signs of the sign switching units 220, 240, 320, and 340 of the carrier recovery unit 106 and clock recovery unit 107, to "plus". In this way, the sign switching units 220, 240, 320, and 340 output an input signal without a change.

Here, the time period from the time T0 to the time T1 has a duration of Tb. It is assumed that $3 \times Tb \leq \Delta T$ in the first embodiment. This condition is defined so that demodulation of the partial content A1 is completed before reception of the next partial content A2 starts, thereby displaying the content A continuously and favorably, and to avoid an excessive amount of digital data from being stored in the memory 105.

At the time T1 when the reception apparatus 100 completes the reception of the partial content A1, the switch control unit 112 switches the analog unit 116 off. At the time T1, the demodulation control unit 108 sets the signs of the sign switching units 220, 240, 320, and 340 of the carrier recovery unit 106 and clock recovery unit 107, to "minus". In this way, the sign switching units 220, 240, 320, and 340 output an input signal after inversing its sign.

In response to an instruction from the demodulation control unit 108, while the PLL circuits are locked, the memory 105 sequentially outputs the digital data corresponding to the partial content A1, from end to start, backward in the stored order, to the carrier recovery unit 106 and clock recovery unit 107. Here, being designed to process data consecutive in time, a PLL circuit can sequentially process data backward as well as forward in a stored order. In this way, the PLLs can be locked by the time the digital demodulation unit 118 starts demodulating the partial content A1 received since the time T0, even though the PLLs start the synchronization establishment operation at the time T0. Here, at the time T0, the analog unit 116 and synchronization/recovery unit 117 are switched on, and the reception apparatus 100 starts receiving the partial content A1.

After having output the entire digital data stored thereon backward in the stored order to the PLLs, the memory 105 outputs the digital data stored thereon forward in the stored order, from the start of the partial content A1, during the time period from the time T2 to the time T3, in response to an instruction from the demodulation control unit 108. At the same time, the switch control unit 112 switches the digital demodulation unit 118 on, and the demodulation control unit 108 sets the signs of the sign switching units 220, 240, 320, and 340 of the carrier recovery unit 106 and clock recovery unit 107, to "plus". Thus, while being locked, the PLLs track the input signal, which is output from the memory 105 forward in the stored order. As a result, the carrier recovery unit 106 and clock recovery unit 107 respectively generate a carrier and a clock, which are output to the demodulation unit 109. The demodulation unit 109 performs demodulation based on the received carrier and clock.

The TS decoder 110 extracts a desired content from the demodulated signal. The desired content is subjected to error correction by the error correction unit 113, and decoding by the decoding unit 114, and finally output to the display unit 115 including the display and loudspeaker.

The TS decoder 110 also outputs the generated signal to the time information extraction unit 111. The time information extraction unit 111 obtains time information indicating the duration $\Delta T$ from the signal output from the TS decoder 110, and sends the time information to the switch control unit 112. Here, it is assumed that the time information is positioned at the end of the partial content A1. In this case, when the time information extraction unit 111 receives the time information, a time period having a duration of 3·Tb has elapsed after the time T0. Therefore, it is $\Delta T-2 \cdot Tb$ before the reception of the next partial content A2 starts, if the processing delay of the digital demodulation unit 118 is not considered. Accordingly, the time information sent from the time information extraction unit 111 to the switch control unit 112 indicates a duration of $\Delta T-2 \cdot Tb$.

Based on the received time information, the switch control unit 112 switches the analog unit 116 on, when the duration of $\Delta T-2 \cdot Tb$ has passed, so that the analog unit 116 starts receiving the partial content A2.

As seen from FIG. 6, the synchronization/recovery unit 117 is kept switched on for a longer timer period than in the related art. For comparison purpose, FIG. 7 shows a timing chart illustrating a switch control timing of a functional unit in a conventional reception apparatus. As seen from FIG. 7, a training period having a duration of Tcap is conventionally provided during which a PLL performs an operation to establish synchronization. The analog unit 116, synchronization/recovery unit 117, and digital demodulation unit 118 are all switched on at the same time T0, and switched off at the same time when reception of the partial content A1 ends. The duration Tcap is varied depending on the reception environment, but in most cases, set substantially the same as the duration Tb. As the comparison between FIGS. 6 and 7 indicates, the operating time of the synchronization/recovery unit 117 is longer in the reception apparatus 100 than in the conventional reception apparatus, by the duration of the time period for which the PLLs track the digital data output from the memory 105 backward in the stored order. On the other hand, the time period for which the analog unit 116 is switched on is shorter in the reception apparatus 100, by the duration Tcap. It may seem that power consumption of the reception apparatus 100 is higher because the synchronization/recovery unit 117 is switched on for a longer time period. However, the power consumption of the synchronization/recovery unit 117 is much smaller than that of the analog unit 116. Therefore, significant reduction in power consumption of the analog unit 116 can reduce the power consumption of the reception apparatus 100 as a whole. Here, the time period for which the analog unit 116 is switched on is substantially half in the reception apparatus 100 when compared with the conventional reception apparatus. As a result, the first embodiment of the present invention can produce sufficient effects in reducing power consumption.

Here, the amount of the digital data corresponding to the partial content A1 stored in the memory 105 varies over time as shown in FIG. 6E. In detail, from the time T0 to the time T1, the amount of the digital data increases since a received signal is sequentially converted into digital data, and the digital data is sequentially stored. Thus, at the time T1, digital data corresponding to the entire partial content A1 is stored in the memory 105. From the time T1 to the time T2, the amount of the digital data does not vary since the PLLs track the digital data corresponding to the partial content A1 output from the memory 105 backward in the stored order. From the time T2 to the time T3, the amount of the digital data decreases since the digital data corresponding to the partial content A1 is sequentially read to be demodulated by the digital demodulation unit 118, and the read digital data is sequentially deleted.

The maximum amount of digital data to be stored in the memory 105 is expressed as M·Tb, which is a product of M denoting the amount of data stored per unit time and Tb denoting the duration of the time period from the time T0 to the time T1. When a signal is quantified in 10 bits with the sampling frequency of 20 MHz, for example, M=200 Mbit/s. Here, under the assumption of Tb=250 ms, the memory 105 is required to have a capacity of at least 50 Mbits.

According to the first embodiment of the present invention, at the start of the time period during which a desired signal is transmitted, the tuner 102 is switched on to receive a signal. Based on the received signal, the reception apparatus 100 establishes synchronization, and also performs demodulation, as described above. Note that, even though there is a gap between the time periods during which the partial contents A1 and A2 are respectively transmitted, the partial contents A1 and A2 are continuously displayed and played back without disconnection.

Second Embodiment

A second embodiment is different from the first embodiment in that, as soon as the carrier recovery unit 106 and clock recovery unit 107 establish synchronization, the memory 105 starts to output the digital data backward in the stored order to the carrier recovery unit 106 and clock recovery unit 107.

<Construction>

In the second embodiment, the reception apparatus 100 has substantially the same construction as in the first embodiment. Therefore, the following does not mention the construction of the reception apparatus 100, and describes the operation of the reception apparatus 100 relating to the second embodiment, with reference to the timing chart shown in FIG. 8.

However, it should be noted that the demodulation control unit 108 shown in FIG. 1 includes a circuit to generate a high-speed clock in order to speed up processing according to the second embodiment (This circuit is not shown in FIG. 1 though.).

<Operation>

FIG. 8 is substantially the same as FIG. 6. FIG. 8B illustrates a timing to switch the analog unit 116 on and off. FIG. 8C illustrates a timing to switch the synchronization/recovery unit 117 on and off. FIG. 8D illustrates a timing to switch the digital demodulation unit 118 on and off. FIG. 8E illustrates the amount of digital data in the memory 105 at each time. In FIG. 8F, a difference in frequency output from the loop filters 230 and 330 is plotted along the vertical axis, and a position of digital data being processed at each time in the partial content A1 is plotted along the horizontal axis. FIG. 8F is a schematic view illustrating an output of the loop filters 230 and 330. When synchronization is established at the time T1, the difference in frequency becomes substantially zero (when the arrow extends horizontally). Here, in FIG. 8F, the arrow from the time T1 to the time T2, and the arrow from the time T2 to the time T3 are drawn separately for better intelligibility, but actually overlaid. In FIG. 8F, the bold arrows indicate the time periods during which an operation is performed at a high-speed clock.

The switch control unit 112 switches the analog unit 116 and synchronization/recovery unit 117 on at the start time for receiving the partial content A1. Thus, the reception apparatus 100 starts receiving the partial content A1 via the antenna 101. The ADC 103 converts the received signal into digital data, and stores the digital data in the memory 105 in association with the received time at which the signal is received. The memory 105 outputs the stored digital data to the carrier recovery unit 106 and clock recovery unit 107, in response to an instruction from the demodulation control unit 108. Thus, the carrier recovery unit 106 and clock recovery unit 107 perform an operation to establish synchronization. Here, it is assumed that synchronization is established at the time T1, in the second embodiment. It should be noted the time period required to establish synchronization is varied depending on the reception environment. At the time T1, the lock detection units 236 and 336 of the carrier recovery unit 106 and clock recovery unit 107 detect that the carrier recovery unit 106 and clock recovery unit 107 are locked, and output a lock detection signal, to the demodulation control unit 108.

When receiving the lock detection signal at the time T1, the demodulation control unit 108 sets the signs of the sign switching units 220, 240, 320, and 340 of the both PLLs, to "minus". At the same time, in response to an instruction from the demodulation control unit 108, the memory 105 sequentially outputs the digital data stored thereon at an S times faster clock, beginning with digital data in association with the time at which the synchronization is established to digital data at the start, i.e. backward in the stored order. The PLLs of the synchronization/recovery unit 117 track, at the S times faster clock, the digital data output from the memory 105 backward in the stored order. Here, even while the memory 105 outputs the digital data, the reception apparatus 100 sequentially receives the partial content A1 via the antenna 101, and the ADC 103 sequentially converts a received signal into digital data, and stores the digital data into the memory 105.

At the time T2, the memory 105 completes outputting the digital data stored thereon up to the start, and the switch control unit 112 switches the digital demodulation unit 118 on. The memory 105 then outputs the stored digital data to the carrier recovery unit 106 and clock recovery unit 107, beginning with the digital data at the start, forward in the stored order, at the S times faster clock, in response to an instruction from the demodulation control unit 108.

From the time T2, while being locked, the PLLs in the reception apparatus 100 track, at the S times faster clock, the input signal which is output from the memory 105 forward in the stored order. Thus, the carrier recovery unit 106 and clock recovery unit 107 respectively generate a carrier and a clock. Based on the generated carrier and clock, the demodulation unit 109 demodulates the partial content A1, from its start, at the S times faster clock.

After the time T2, the synchronization/recovery unit 117 and digital demodulation unit 118 operate at a high-speed clock. Note that, however, the decoding unit 114 and display unit 115 operate at a normal clock.

It is assumed that the demodulation for the digital data stored in the memory 105 is completed before the reception apparatus 100 completes receiving the partial content A1. This is possible because the synchronization/recovery unit 117 and digital demodulation unit 118 operate at the S times faster clock between the time T1 and time T3. After the time T3, since the reception apparatus 100 operates in the same manner as a normal reception apparatus, the synchronization/recovery unit 117 and digital demodulation unit 118 operate at a normal clock. Specifically speaking, a signal received by the reception apparatus 100 is converted into digital data by the ADC 103, and the digital data is demodulated without being stored into the memory 105 temporarily. The demodulated data is subjected to appropriate operations, so that images and sounds composing the partial content A1 are output by the display unit 115.

The time period from the time T0 to the time T1 has a duration of TL to establish synchronization, in the second embodiment. Between the time T1 and time T3, the synchronization/recovery unit 117 operates at a high-speed clock generated by the demodulation control unit 108. This high-speed clock is S times as fast as an original processing clock. In this case, the time period from the time T1 to the time T2 during which the PLLs track the digital data which is output from the memory 105 backward in the stored order has a duration Tr=TL/S, and the time period from the time T2 to the time T3 during which the digital demodulation unit 118 demodulates the digital data output from the memory 105 has a duration Tf=(TL/S){(S+1)/(S−1)}. From the time T3 to the time T4, the digital demodulation unit 118 performs demodulation, in real-time, at the actual transmission rate. The time period from the T3 to the time T4 has a duration Tn=Tb−TL−

Tr−Tf. To complete demodulating the entire digital data stored in the memory 105 before the reception apparatus 100 completes receiving the partial content A1 in the second embodiment, the condition Tb>TL{1+1/S+(S+1)/(S·(S−1))} needs to be satisfied.

According to the second embodiment, the amount of the digital data stored in the memory 105 varies as shown in FIG. 8E. From the time T0, the digital data corresponding to the partial content A1 is increasingly stored. After the time T2, the digital data is sequentially deleted from the memory 105 since the digital demodulation unit 118 starts demodulating the digital data output from the memory 105 from the start. As a result, no digital data is stored in the memory 105 at the time T3. After the time T3, the digital data corresponding to the partial content A1 is demodulated without being stored into the memory 105, since synchronization has already been established. Here, the maximum amount of the digital data to be stored in the memory 105 is expressed as M·TL(1+1/S), when M denotes the amount of digital data stored per unit time. When a signal is quantified in 10 bits with the sampling frequency of 20 MHz, for example, M=200 Mbit/s. Here, under the assumption of TL=50 ms and S=2, the memory 105 is required to have a capacity of at least 15 Mbits.

As in the first embodiment, the time information extraction unit 111 corrects the extracted time information indicating ΔT based on the processing delay, and the switch control unit 112 uses the corrected time information.

FIG. 9 illustrates a case where the demodulation of the digital data stored in the memory 105 is not completed before the reception apparatus 100 completes receiving the partial content A1, despite the use of a high-speed clock. As shown in FIG. 9, even though the PLLs track the digital data at a high-speed clock, demodulation of the digital data stored in the memory 105 is not completed before the time T3, when the reception apparatus 100 completes receiving the partial content A1. In this case, between the time T3 and time T4, the remaining digital data corresponding to the partial content A1 is read from the memory 105 and demodulated, at a normal clock. Here, a normal clock is used instead of a high-speed clock between the time T3 and time T4 because a high-speed clock requires high power consumption.

Third Embodiment

A third embodiment is different from the first and second embodiments in terms of the following feature. Once synchronization is established, the reception apparatus 100 receives a signal stably, demodulates digital data corresponding to the received signal, and stores the demodulated digital data. As soon as completing reception of the partial content A1, the reception apparatus 100 demodulates the digital data that has been stored in the memory 105 before the synchronization is established. Based on this demodulated digital data, together with the demodulated digital data after synchronization is established, the reception apparatus 100 displays the partial content A1.

<Construction>

Figure 4:
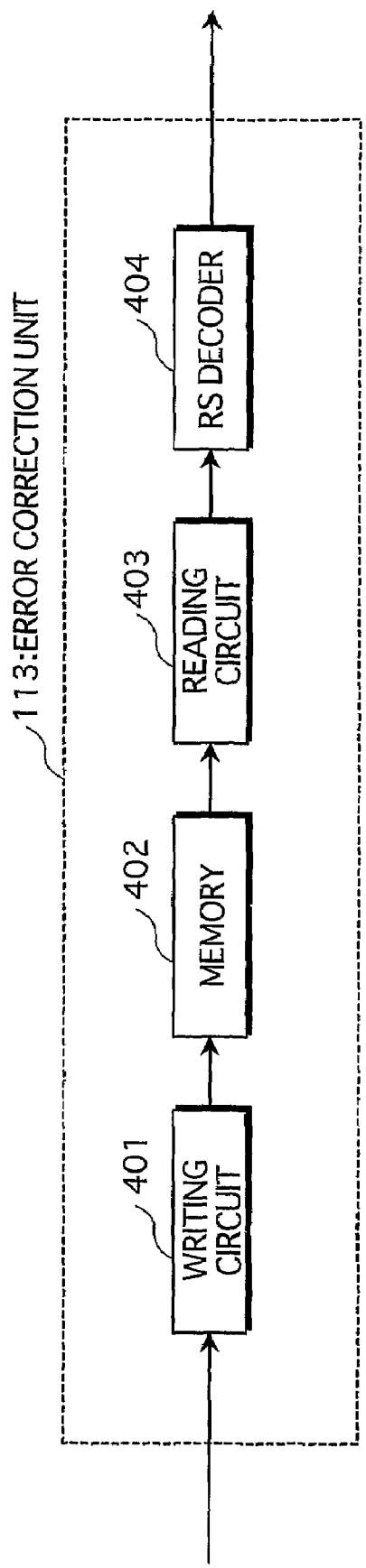
FIG. 4 is a functional block diagram illustrating a construction of an error correction unit 113 in the reception apparatus 100.

When the third embodiment is compared with the first and second embodiments, the memory in the error correction unit 113 is utilized differently. After synchronization is established, the reception apparatus 100 demodulates a received signal in real-time. Here, the memory for deinterleaving in the error correction unit 113 is utilized to store the signal demodulated in real-time and a signal which is received before synchronization is established, and demodulated after the reception of the partial content A1 is completed. FIG. 4 shows the functional construction of the error correction unit 113.

As shown in FIG. 4, the error correction unit 113 is constituted by a writing circuit 401, a memory 402, a reading circuit 403, and an RS decoder 404.

The writing circuit 401 has a function of writing digital data output from the TS decoder 110 into the memory 402, so that the digital data is temporarily stored.

The memory 402 has a function of storing data written by the writing circuit 401, in other words, data obtained by demodulating a signal received by the reception apparatus 100.

The reading circuit 403 has a function of reading the data stored in the memory 402, forward from the start.

The RS decoder 404 has a function of performing RS decoding on a signal output from the reading circuit 403, and outputting the RS-decoded signal to the decoding unit 114.

In the third embodiment, the other functional units of the reception apparatus 100 are the same as in the first embodiment, and are therefore not described.

<Operation>

The following describes the operation of the reception apparatus 100 relating to the third embodiment, with reference to the timing chart shown in FIG. 10.

The switch control unit 112 switches the analog unit 116 and synchronization/recovery unit 117 on, at the time T0 when the reception apparatus 100 starts receiving the partial content A1. Thus, the tuner 102 receives a signal via the antenna 101, and the ADC 103 converts the received signal into digital data. The digital data is sequentially stored in the memory 105 in association with the time when the signal is received.

The digital data stored in the memory 105 is sequentially output to the carrier recovery unit 106 and clock recovery unit 107. Thus, the PLL in each of the carrier recovery unit 106 and clock recovery unit 107 performs an operation to establish synchronization. After synchronization is established at the time T1, digital data obtained by converting a received signal is demodulated without being stored into the memory 105. Here, when receiving a lock detection signal from the lock detection units 236 and 336, the switch control unit 112 switches the digital demodulation unit 118 on.

Between the time T1 and time T2, digital data obtained by converting a signal corresponding to the partial content A1 is not stored into the memory 105, but demodulated in real-time by the digital demodulation unit 118. The demodulated data is written, by the writing circuit 401, into the memory 402 in the error correction unit 113, as data corresponding to the time period from the time T1 to the time T2. How the demodulated data is written into the memory 402 is described later.

When the current time becomes the time T2 when the reception apparatus 100 completes receiving the partial content A1, the switch control unit 112 switches the analog unit 116 and digital demodulation unit 118 off.

Subsequently, the demodulation control unit 108 sets the signs of the sign switching units 220, 240, 320, and 340 of the carrier recovery unit 106 and clock recovery unit 107, to "minus". Furthermore, the demodulation control unit 108 instructs the memory 105 to output the digital data stored thereon, starting from the digital data corresponding to the time T1 up to the digital data corresponding to the time T0, backward in the stored order, to the carrier recovery unit 106 and clock recovery unit 107. Also, the demodulation control unit 108 instructs the PLLs in the carrier recovery unit 106 and clock recovery unit 107 to track the digital data output from the memory 105 backward in the stored order, with synchronization being maintained.

At the time T3, the memory 105 completes outputting the digital data stored thereon up to the start. At the same time, the demodulation control unit 108 sets the signs of the sign switching units 220, 240, 320, and 340 of the carrier recovery unit 106 and clock recovery unit 107, to "plus". Also, the switch control unit 112 switches the digital demodulation unit 118 on.

The demodulation control unit 108 then instructs the memory 105 to output the digital data stored thereon forward in the stored order, i.e. from the digital data corresponding to the time T0 to the digital data corresponding to the time T1, to the carrier recovery unit 106 and clock recovery unit 107. Based on the output digital data, the carrier recovery unit 106 and clock recovery unit 107 respectively generate a carrier and a clock. Based on the generated carrier and clock, the demodulation unit 109 performs demodulation. From a signal output from the demodulation unit 109, the TS decoder 110 extracts a desired content. Then, the desired content is written into the memory 402 in the error correction unit 113, as data corresponding to the time period from the time T3 to the time T4. As a result, the demodulated data corresponding to the entire partial content A1 has been written into the memory 402, and deinterleaving therefore becomes possible. After this, the demodulated data is subjected to RS decoding by the RS decoder 404, subjected to decoding by the decoding unit 114, and displayed on the display unit 115. In this way, the partial content A1 can be displayed without disconnection, with its parts being in order.

FIG. 5A includes schematic views illustrating how to write/read demodulated data into/from the memory 402 in the third embodiment. It is assumed that the memory 402 stores data in two-dimensional arrangement. According to the third embodiment, the data demodulated by the digital demodulation unit 118 is written, as shown by the arrow from T1 to T2 shown in a data writing view 501, between the time T1 and time T2, in accordance with address control by the writing circuit 401. Between the time T3 and time T4, the digital data, which is stored in the memory 105 before synchronization is established, is demodulated by the digital demodulation unit 118, and written as shown by the arrow from T3 to T4 in the view 501. The demodulated data corresponding to the entire partial content A1 is read in a row direction, from top left to bottom right, as shown in a data reading view 502, in accordance with address control by the reading circuit 403.

FIG. 5B shows how to write/read demodulated data into/from the memory 402 according to the first and second embodiments, for comparison purpose. The digital data is demodulated between the time T2 and time T3 according to the first embodiment, and between the time T2 and time T4 according to the second embodiment. The demodulated data is written in a column direction from top left to bottom right as shown by the arrow in a data writing view 511. The demodulated data stored in the memory 402 is sequentially read in a row direction from top left to bottom right as shown by the arrow in a data reading view 512, in accordance with address control by the reading circuit 403.

FIG. 10E illustrates the transition of the amount of the digital data in the memory 105 in the third embodiment. As shown in FIG. 10E, the digital data is increasingly stored in the memory 105 between the time T0 and time T1. Between the time T1 and time T2, the amount of the digital data in the memory 105 does not increase, since the received signal is converted into digital data, and the digital data is demodulated without being stored in the memory 105. Between the time T2 and time T3, the amount of the digital data in the memory 105 does not change since the PLLs track the digital data which is output from the memory 105 backward in the stored order. Between the time T3 and time T4, the stored digital data is demodulated. Thus, the memory 105 is increasingly emptied, beginning with its area storing the start of the partial content A1. As a result, the entire data corresponding to the partial content A1 has been deleted from the memory 105 at the time T4. The maximum amount of digital data to be stored in the memory 105 is expressed as M·TL, when M denotes the amount of data stored per unit time. When a signal is quantified in 10 bits with the sampling frequency of 20 MHz, for example, M=200 Mbit/s. Here, under the assumption of TL=50 ms, the memory 105 is required to have a capacity of at least 10 Mbits.

As in the first embodiment, the time information extraction unit 111 corrects the extracted time information indicating ΔT based on the processing delay, and the switch control unit 112 uses the corrected time information.

Modification Examples

The present invention is not limited to the above embodiments, and includes the following modification examples.

(1) According to the above embodiments, the reception apparatus 100 is a reception apparatus used in multicarrier transmission, for example, DVB-H standard. However, the reception apparatus 100 may be a reception apparatus used in single carrier transmission.

(2) According to the above embodiments, the demodulation is conducted by using the PLL circuits. Instead of PLL circuits, however, other types of circuits that can establish synchronization based on a desired signal and perform demodulation can be used to realize the reception apparatus 100.

(3) According to the second embodiment, a high-speed processing clock is utilized when the PLLs track the digital data which is output from the memory 105 backward in the stored order to restore the digital data, while being locked. However, a normal clock can be alternatively used, as long as all of the necessary processes for a partial content are completed before the next partial content is received.

(4) According to the above embodiments, synchronization is established at the time T1. However, this may not be possible because of bad reception environment. To deal with this problem, the tuner 102 may be switched on slightly before the time T0.

(5) Each of the functional units of the reception apparatus 100 relating to the above embodiments may be realized by using the whole or part of a circuit such as Large Scale Integration (LSI) and Very Large Scale Integration (VLSI). Alternatively, each functional unit may be realized by using a plurality of LSIs, a combination of one or more LSIs and a circuit of a different type, or the like.

(6) The above description of the embodiments simply mentions that the switch control unit 112 switches the analog unit 116, synchronization/recovery unit 117, and digital demodulation unit 118 on and off. Specifically speaking, this function can be realized by power supply control based on opening and closing an electric control switch provided to a power supply line, switching control between normal and power-saving modes based on configuration of a resistor in an Integrated Circuit (IC) or LSI, termination of an operating clock of an LSI, or the like. Furthermore, the switch control unit 112 also switches part of one or more circuits forming each of the above functional units on and off.

(7) According to the above embodiments, the data in the PLLs, i.e. in the D latches 234 and 334 in the carrier recovery unit 106 and clock recovery unit 107 is reset at the reception starting time T0. However, the PLLs may start an operation to establish synchronization, with keeping the data stored in the D latches 234 and 334 at the end of reception of a previous partial content. In this way, it is likely to be only a slight difference in frequency and phase which is detected during the synchronization establishing operation. Therefore, synchronization can be established within a shorter time period.

(8) According to the above embodiments, the digital demodulation unit 118 is switched off during the time period for which the PLLs track the digital data which is output from the memory 105 backward in the stored order, i.e. between the time T1 and time T2 in the first and second embodiments, and between the time T2 and time T3 in the third embodiment. However, an FFT circuit in the demodulation unit 109 in the digital demodulation unit 118 and a synchronization judgment unit (both not shown in the drawings) to judge whether synchronization has been established in the frequency domain may be supplied with power so as to operate, even during the above time period. In this way, frame synchronization can be detected, and a Transmission Multiplexing Configuration Control (TMCC) signal and a Transmission Parameter Signalling (TPS) signal can be decoded, within the above time period. According to this construction, frame synchronization is established, and the transmission parameters are decoded by the time T2 in the first and second embodiments, and by the time T3 in the third embodiment. As a result, the demodulation unit 109 can complete demodulating the digital data which is output from the memory 105 forward in the stored order, within a shorter time period.

(9) According to the above embodiments, the analog unit 116 is switched on at the time T0 at which the reception apparatus 100 starts receiving the partial content A1, to simplify the description. However, the analog unit 116 actually needs to be switched on prior to the time T0, by a pull-in time of the AGC 104 (approximately several dozen milliseconds).

(10) According to the above embodiments, an input signal is processed in the order of the carrier recovery unit 106 and clock recovery unit 107. However, this order may be reversed since the carrier recovery unit 106 and clock recovery unit 107 perform operations independently from each other.

(11) The above description of the embodiments does not make particular reference to the empty area in the memory 105 which increases as the demodulation proceeds. However, such an empty area in the memory 105 may be utilized for supporting the demodulation performed by the demodulation unit 109.

(12) The present invention can be applied to realize a reception operation to only monitor a flag inserted cyclically into a content continuous along the time axis. This reception operation can be utilized to realize a flag monitoring function that lasts for long hours in battery-powered mobile telephones, for example. Specifically speaking, the reception operation enables a receiver to be switched on only during a time period for which a signal including a flag is transmitted on a time-division multiplexing basis. In the case of this type of time-division multiplexing signal reception, it is only a signal including a flag which needs to be demodulated. In other words, a signal continuous in the time axis needs not to be demodulated. If this reception operation is combined with the first embodiment, for example, a signal including a flag can be demodulated during the time period from the time T1 to the time T2, for which the PLLs track the digital data which is output from the memory 105 backward in the stored order. In this way, the demodulation originally performed between the time T2 and time T3 can be omitted.

INDUSTRIAL APPLICABILITY

The present invention can provide a reception apparatus to be used in mobile telephones and the like that receive digital broadcast transmitted by using time-division multiplexing.

The invention claimed is:

1. A reception apparatus for receiving a broadcast wave carrying a signal string transmitted on a time-division multiplexing basis, the signal string including a modulation signal generated by digital modulating a desired signal and another signal using a predetermined modulation method, the reception apparatus comprising:
a receiving unit operable to operate to receive the broadcast wave only during a time period for which part of the modulation signal corresponding to the desired signal is transmitted, and generate an analog input signal;
an input stream generating unit operable to generate an input stream by analog-to-digital converting the input signal generated by the receiving unit;
a storing unit operable to store the input stream in association with a generating time at which the receiving unit generates the input signal; and
a demodulating unit operable to demodulate the input stream stored in the storing unit, by using a demodulation method corresponding to the predetermined modulation method, to obtain the desired signal, wherein
the demodulating unit includes:
a PLL (Phase Locked Loop) unit operable to generate a carrier and a clock based on the input stream;
a digital demodulation unit operable to perform demodulation by using the carrier and clock generated by the PLL unit, to obtain the desired signal; and
a demodulation control unit operable to control the storing unit and PLL unit so as to go through first, second, and third steps,
in the first step, the storing unit outputs the input stream to the PLL unit, forward in an order of the generating time, beginning with a start of the input stream, so that the PLL unit performs an operation to establish synchronization based on the input stream output from the storing unit,
in the second step which starts at or after a time when the PLL unit establishes the synchronization, the storing unit outputs the input stream backward in the order of the generating time, up to the start, so that the PLL unit tracks the input stream while maintaining the synchronization, and
in the third step, the storing unit outputs the input stream forward in the order of the generating time, beginning with the start, so that the PLL unit generates the carrier and clock while maintaining the synchronization, and the digital demodulation unit performs the demodulation based on the carrier and clock, to obtain the desired signal.

2. The reception apparatus of claim 1, wherein
the second step starts at the time when the PLL unit establishes the synchronization in the first step.

3. The reception apparatus of claim 2, wherein
the demodulating unit further includes:
a high-speed clock generating unit operable to generate a high-speed clock faster than a normal rate, and
in the second step, the PLL unit operates at the high-speed clock generated by the high-speed clock generating unit, and in the third step, the PLL unit and digital demodulation unit operate at the high-speed clock.

4. The reception apparatus of claim 3, wherein
in the third step, if an entire input stream stored in the storing unit is demodulated by the digital demodulation unit before the receiving unit completes receiving the modulation signal, an input signal subsequently generated by the receiving unit is analog-to-digital converted into an input stream, and the input stream is demodulated by the digital demodulation unit without being stored into the storing unit.

5. The reception apparatus of claim 1, further comprising:
a switch control unit operable to appropriately switch the receiving unit, PLL unit, digital demodulation unit on or off.

6. The reception apparatus of claim 1, wherein
the demodulating unit further includes:
a storage unit operable to store the desired signal obtained by the digital demodulation unit,
before the time when the PLL unit establishes the synchronization in the first step, an input signal generated by the receiving unit is analog-to-digital converted into an input stream, and the input stream is stored into the storing unit,
after the time when the PLL unit establishes the synchronization in the first step, an input signal generated by the receiving unit is analog-to-digital converted into an input stream, the input stream is demodulated by the digital demodulation unit, without being stored into the storing unit, to obtain part of the desired signal, and the obtained part of the desired signal is stored into the storage unit, and
after the receiving unit completes receiving the modulation signal, the digital demodulation unit demodulates the input stream that is stored in the storing unit before the time when the PLL unit establishes the synchronization, through the second and third steps.

7. A reception and demodulation method utilized in a reception apparatus for receiving a broadcast wave carrying a signal string transmitted on a time-division multiplexing basis, the reception apparatus including a PLL (Phase Locked Loop) unit, and the signal string including a modulation signal generated by digital modulating a desired signal and another signal using a predetermined modulation method, wherein
the broadcast wave is received only during a time period for which part of the modulation signal corresponding to the desired signal is transmitted, and an analog input signal is generated,
an input stream is generated by analog-to-digital converting the input signal,
the input stream is stored in association with a generating time at which the input signal is generated,
the stored input stream is output, to the PLL unit, from a start thereof forward in an order of the generating time so that the PLL unit performs an operation to establish synchronization based on the output input stream,
at or after a time when the PLL unit establishes that synchronization, the stored input stream is output backward in the order of the generating time, up to the start, so that the PLL unit tracks the output input stream while maintaining the synchronization,
the stored input stream is output forward in the order of the generating time, beginning with the start, so that the PLL unit generates a carrier and a clock while maintaining the synchronization, and
demodulation is performed based on the carrier and clock, to obtain the desired signal.

8. An integrated circuit mounted in a reception apparatus for receiving a broadcast wave carrying a signal string transmitted on a time-division multiplexing basis, the signal string including a modulation signal generated by digital modulating a desired signal and another signal using a predetermined modulation method, the integrated circuit comprising:
a receiving unit operable to operate to receive the broadcast wave only during a time period for which part of the modulation signal corresponding to the desired signal is transmitted, and generate an analog input signal;
an input stream generating unit operable to generate an input stream by analog-to-digital converting the input signal generated by the receiving unit;
a storing unit operable to store the input stream in association with a generating time at which the receiving unit generates the input signal; and
a demodulating unit operable to demodulate the input stream stored in the storing unit, by using a demodulation method corresponding to the predetermined modulation method, to obtain the desired signal, wherein
the demodulating unit includes:
a PLL (Phase Locked Loop) unit operable to generate a carrier and a clock based on the input stream;
a digital demodulation unit operable to perform demodulation by using the carrier and clock generated by the PLL unit, to obtain the desired signal; and
a demodulation control unit operable to control the storing unit and PLL unit so as to go through first, second, and third steps,
in the first step, the storing unit outputs the input stream to the PLL unit, forward in an order of the generating time, beginning with a start of the input stream, so that the PLL unit performs an operation to establish synchronization based on the input stream output from the storing unit,
in the second step which starts at or after a time when the PLL unit establishes the synchronization, the storing unit outputs the input stream backward in the order of the generating time, up to the start, so that the PLL unit tracks the input stream while maintaining the synchronization, and
in the third step, the storing unit outputs the input stream forward in the order of the generating time, beginning with the start, so that the PLL unit generates the carrier and clock while maintaining the synchronization, and the digital demodulation unit performs the demodulation based on the carrier and clock, to obtain the desired signal.

* * * * *